(12) United States Patent
Criddle et al.

(10) Patent No.: US 6,722,129 B2
(45) Date of Patent: Apr. 20, 2004

(54) CRANK CASE VENTILATION SYSTEM

(75) Inventors: Mark Anderson Criddle, Chelmsford (GB); William Marc Edward Brotherton, Brentwood (GB)

(73) Assignee: Visteon Global Technologies, Inc., Dearborn, MI (US)

( * ) Notice: Subject to any disclaimer, the term of this patent is extended or adjusted under 35 U.S.C. 154(b) by 0 days.

(21) Appl. No.: 10/324,282

(22) Filed: Dec. 19, 2002

(65) Prior Publication Data

US 2003/0140909 A1 Jul. 31, 2003

(51) Int. Cl.$^7$ ............................................... F02B 33/44
(52) U.S. Cl. ..................... 60/605.2; 60/612; 123/562; 123/564; 123/572; 123/574
(58) Field of Search ...................... 605/605.1, 605.2, 605/605.12; 123/562, 564, 572, 574

(56) References Cited

U.S. PATENT DOCUMENTS

| | | | |
|---|---|---|---|
| 4,550,794 A | * 11/1985 | Inoue et al. | 180/219 |
| 5,205,265 A | * 4/1993 | Kashiyama et al. | 123/568.12 |
| 5,714,683 A | * 2/1998 | Maloney | 73/118.2 |

FOREIGN PATENT DOCUMENTS

| | | |
|---|---|---|
| DE | 196 27 412 | 1/1998 |
| EP | 1 045 117 | 10/2000 |
| EP | 1 070 837 | 1/2001 |
| EP | 1 154 133 | 11/2001 |

\* cited by examiner

*Primary Examiner*—Hoang Nguyen
(74) *Attorney, Agent, or Firm*—Brinks Hofer Gilson & Lione

(57) ABSTRACT

The present invention relates to a crank case ventilation system for an internal combustion engine that has a two-stage air charge boosting system. An air inlet system supplies the engine with air that may be pressurised by an upstream supercharger and a downstream turbocharger in series. A crank case evacuation system draws crank case gasses from a crank case and introduces said gasses into the air inlet system, through either a first conduit or a second conduit, depending on the setting of a pressure-regulated control valve. The first conduit is used to introduce said gasses upstream of the first boost stage when this stage is operational, and when the first boost stage is not operational, the second conduit is used to introduce said gasses downstream of the first boost stage and upstream of the second boost stage.

15 Claims, 1 Drawing Sheet

CRANK CASE VENTILATION SYSTEM

BACKGROUND a. Field of the Invention

The present invention relates to a crank case ventilation system for an internal combustion engine that has a two-stage air charge boosting system.

b. Related Art

During the normal operation of an internal combustion engine, combustion gases are forced past the piston compression rings by the combustion pressure into the crank case region of the engine. This flow of "blow by" gas is most noticeable on turbocharged or diesel engines because of the higher cylinder pressures typical with such engines. It is necessary to release these gases from the crank case in order to prevent a build up of pressure which could lead to ineffective oil sealing. Typically, it is desirable to maintain a crank case pressure close to atmospheric pressure. For example, one specification requires that the crank case pressure is maintained with −2.5 kPa to +5 kPa of atmospheric pressure.

As the blow by gases contain numerous combustion products and engine oil picked up from the crank case, it is not possible to vent the gases to the atmosphere and it is normal to implement a closed Crank Case Ventilation (CCV) system that separates the oil vapour from the gases and then feeds these back into the engine intake. In the case of a turbocharged engine one way of doing this is to feed the blow by gases back into the air inlet system upstream of the turbocharger. This avoids the need for a pump in the return path of the crank case gasses that would otherwise be needed to overcome the increased pressure in the air inlet path downstream of the turbocharger.

Normally, the amount of air supplied to a turbocharged engine is measured using a Mass Air Flow (MAF) sensor upstream of the turbocharger. One important consideration is that the entry point for the crank case gasses must be sufficiently far away from the Mass Air Flow (MAF) sensor in order that any air flow reversal does not carry the blow by gases back to the MAF sensor and contaminate it.

The present invention concerns the case where two compressors are connected in series. This may be desirable, for example, if the downstream compressor is a turbocharger that becomes operational about a certain minimum engine speed, and the upstream compressor is an electrically driven supercharger that can be activated upon demand in engine operating regions where the turbocharger is ineffective.

The space in the engine compartment of a typical motor vehicle is cramped, and so the provision of two compressors makes it more difficult to package the entire assembly so that recirculated crank case gasses do not contaminate any MAF sensor placed upstream of the compressors.

It is also the case that certain types of compressor bearings can be adversely affected over time by contamination from the blow by gasses. While it may always be possible to design bearings that are less affected by such contamination, this can increase the cost of a compressor.

SUMMARY OF THE INVENTION

It is an object of the present invention to provide a crank case ventilation system that addresses these issues.

According to the invention, there is provided a crank case ventilation system for an internal combustion engine, comprising an air inlet system for supplying the engine with air, an engine air charge pressure boosting system for boosting the pressure of said air supply, and a crank case evacuation system for drawing crank case gasses from a crank case and introducing said gasses into the air inlet system, wherein:

a) the air charge boosting system has in series a first boost stage and a second boost stage, the first boost stage being upstream of the second boost stage;

b) the crank case evacuation system includes a first conduit and a second conduit for introducing the crank case gasses into the air inlet system, the first conduit introducing said gasses upstream of the first boost stage, and the second conduit introducing said gasses downstream of the first boost stage and upstream of the second boost stage; and c) the crank case evacuation system includes flow control means for controlling the flow of crank case gasses in the first conduit and in the second conduit.

The system will also normally include an oil separator for reducing the amount of oil in the crank case gasses.

It is particularly advantageous if the flow control means is arranged to direct the flow of crank case gasses to the first conduit when the first boost stage is boosting the pressure of the air supply, and to the second conduit when the first boost stage is not boosting the pressure of the air supply. This provides a number of benefits. First, in systems where the first boost stage is operated less than the second boost stage this can then help to minimises the volume of crank case gasses passing through the first boost stage. Second, when the first boost stage is operational, the pressure downstream of this stage will in general be increased. Thus, it is not necessary for the crank case ventilation system to include any means for assisting the flow of crank case gasses in the first conduit or in the second conduit, as the gasses can then be introduced only upstream of the first boost stage.

In a preferred embodiment of the invention, the flow control means is a control valve. Both the first conduit and the second conduit can then lead from the control valve to the air inlet system. The first conduit joins the air inlet system at a first location upstream of the first boost stage, and the second conduit joins the air inlet system at a second location between the first boost stage and the second boost stage.

Also in the preferred embodiment of the invention, the crank case evacuation system includes a third conduit, said third conduit leading from the crank case to the control valve.

The control valve may be an automatic valve that is actuated automatically to admit crank case gasses to the air inlet system through the first conduit or the second conduit as required.

Preferably, the control valve is passively actuated by pressure differences within said conduits. This provides the advantage of not having to provide an electronic control system or electro-mechanical actuators to activate the valve.

The control valve may also be a pressure regulated control valve, that is, a valve actuated by pressure differences across the valve that result in the valve varying the proportion of crank case gasses delivered to the first conduit and the second conduit.

The invention also provides an internal combustion engine comprising a crank case ventilation system, said ventilation system being according to the invention.

Also according to the invention, there is provided, a method of ventilating a crank case of an internal combustion engine, the engine comprising a crank case, an air inlet system, an engine air charge pressure boosting system including a first boost stage and a second boost stage, and a crank case evacuation system linked to both the crank case and air inlet system, the crank case evacuation system including a flow control means, the method comprising the steps of:

i) using the air inlet system to supply air to the engine;

ii) boosting the pressure of said air supply using the first boost stage and the second boost stage;

iii) using the crank case evacuation system to draw crank case gasses from the crank case and introduce said gasses into the air inlet system; and iv) using the flow control means to control the introduction of said gasses into the air inlet system at a plurality of locations in the air inlet system, including a first location upstream of the first boost stage, and a second location downstream of the first boost stage and upstream of the second boost stage.

The flow control means may then be arranged to direct the flow of crank case gasses to the first location when the first boost stage is boosting the pressure of the air supply, and to the second location when the first boost stage is not boosting the pressure of the air supply.

BRIEF DESCRIPTION OF THE DRAWINGS

The invention will now be described in further detail and by way of example only, with reference to the accompanying drawing, in which.

DETAILED DESCRIPTION

Figure 1:
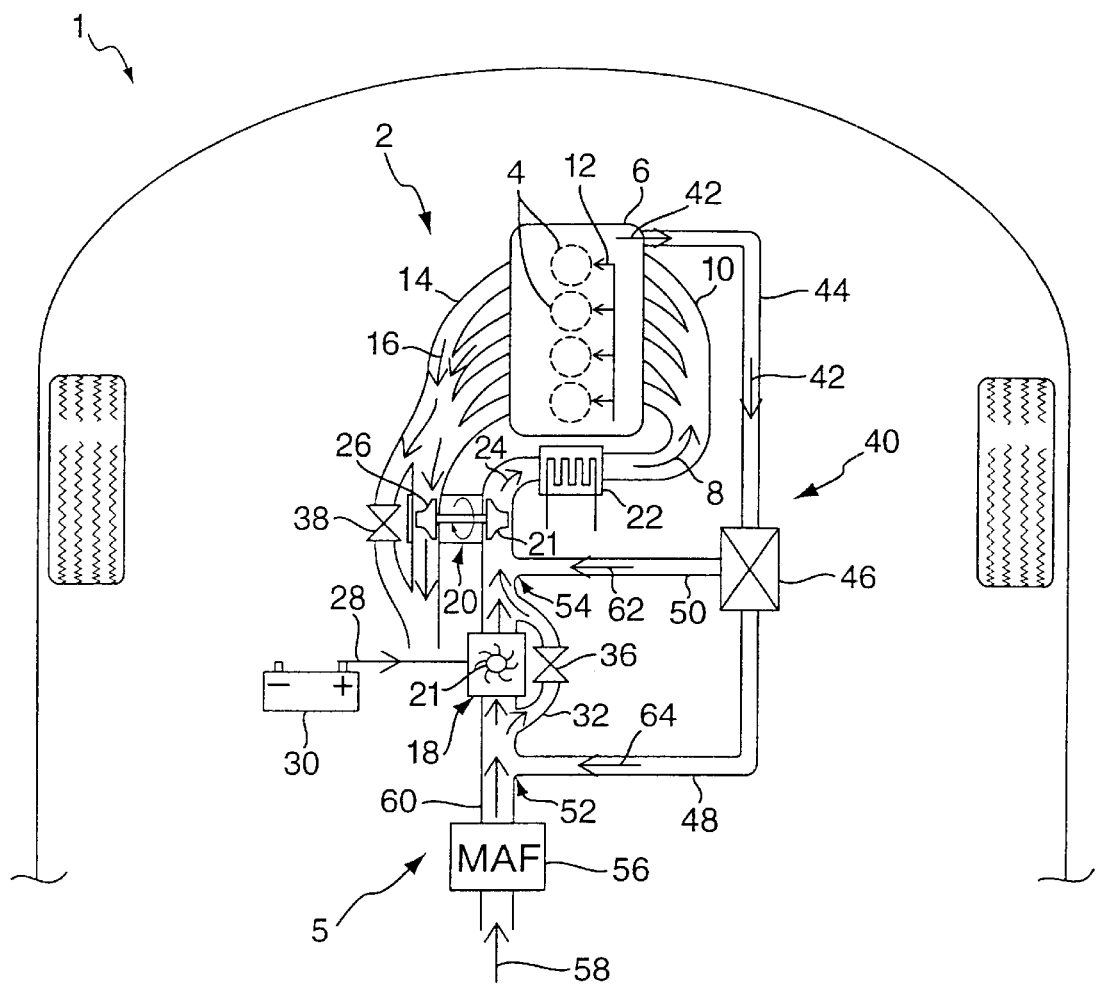
FIG. 1 shows schematically a part of a motor vehicle having, as part of an internal combustion engine, a crank case ventilation system according to the invention.

The engine 2 may be either a compression-ignition or a spark-ignition type engine, and has a number of cylinders 4 situated above a crank case 6. The engine 2 has an air inlet system 5 that supplies inlet air 8 to the cylinders 4 via an inlet manifold 10. Fuel may be supplied to the cylinders 4 via a fuel injection system 12.

The engine 2 also has an exhaust manifold 14 by which exhaust gases 16 leaves the cylinders 4.

Inlet air 8 reaches the inlet manifold 10 through a two-stage engine air charge pressure boosting system, comprising an electrically-driven supercharger 18 upstream of an engine exhaust gas driven turbocharger 20. The supercharger 18 includes a rotating impeller 21 for compressing air, the impeller being mounted on sealed ball type bearings (not shown).

Downstream of the turbocharger 20 is an intercooler 22 which reduces the temperature of compressed air 24 in order to increase the density of inlet air 8 in the inlet manifold 10.

The turbocharger 20 operates in the conventional manner, by boosting the amount of air supplied to the cylinders 4. Such turbocharging systems become effective above a certain minimum engine rpm, for example 1,500 to 2,000 rpm, once the flow of exhaust gas 16 has become sufficient to drive an exhaust gas turbine 26. This results in the effect known as "turbo-lag" in which engine torque is relatively unresponsive to driver demand until the engine has reached the minimum rpm for significant turbo boost.

The engine 2 is therefore provided with the electrically-driven supercharger 18 which is active only intermittently at lower engine speeds in order to increase engine torque according to driver demand. The supercharger 18 does, however, draw a significant amount of current 28 from a vehicle electrical system 30, for example up to 300 Amps. This exceeds the amount that a typical vehicle electrical system 30 can be expected to supply continuously. Therefore, once the engine rpm has reached a point where the turbocharger 20 can compress the inlet air 8 to meet driver demand, the supercharger 18 is deactivated.

In this example, both the supercharger 18 and turbocharger 20 are provided with air bypasses 32. The supercharger bypass 32 includes a bypass valve 36 for controlling the air flow through and past the supercharger 18. Similarly, the turbocharger 20 includes a wastegate valve 38 so that air can bypass the exhaust gas turbine 26 when the turbocharger 20 is not in use, and to limit the pressures and turbocharger speed when the turbocharger 20 is in full use.

It should be noted however, that if the engine is a diesel engine, then the turbocharger may be fitted with Variable Geometry Turbines (VGT) that have variable flow/pressure characteristics to suit all required operating conditions. A wastegate bypass is not required with such VGT devices.

The engine 2 includes a crank case evacuation system 40 by which crank case gases 42 can be evacuated from the crank case 6 and fed back into the inlet air system 5 as part of the inlet air 8. The crank case evacuation system 40 includes an evacuation conduit 44 by which crank case gases 42 are drawn from the crank case 6. The evacuation conduit 44 leads to a pressure controlled two-way valve 46. Two further conduits, a first conduit 48 and a second conduit 50, lead respectively from the two-way valve 46 to join the air inlet system 5 at two locations, one of which 52 is upstream of the supercharger 18, and the other of which 54 is downstream of the supercharger 18 and upstream of the turbocharger 20.

This avoids several problems, and provides a number of benefits over a crank case ventilation system that recirculates crank case gases 42 to just to a single location in the air inlet system 5. The main problem with introducing crank case gases 42 downstream of one of the air charge pressure boosting devices 18, 20 is that when such a pressure boosting device 18, 20 is energised, the pressure in that location of the air inlet system 5 will in general be higher than the pressure inside the crank case 6. Although it is possible to provide a non-return valve to prevent flow of pressurised air back into the crank case 6 through the evacuation conduit 44, it is then not possible for any crank case gases 42 to be evacuated from the crank case 6, without the provision of a pump to force crank case gases 42 along the evacuation conduit 44 against the pressure generated by the pressure boosting device 18, 20.

One solution to this problem might be to introduce at all times the crank case gases 42 at the location 52 upstream of both pressure boosting devices 18, 20. It has been found, however, that this introduces a number of practical problems in the overall design of the air inlet system 5. First, it is generally desirable to provide a mass air flow sensor (MAF) 56 for measuring the amount of air supplied to the engine. The mass air flow sensor 56 is provided upstream of the pressure boosting devices 18, 20. The mass air flow sensor 56 then measures the amount of uncompressed, and therefore unheated, air 58 entering the air inlet system 5. This provides for more reliable measurement of mass air flow. The crank case gases 42 include, however, combustion particulates and oil vapour that could severely contaminate the mass air flow sensor 56 if the location 52 at which such gasses are introduced into the air inlet system 5 is sufficiently close to the mass air flow sensor 56. This is particularly a problem when the volume of uncompressed inlet air 58 is low, for example when the engine 2 is idling, or when the air charge boost suddenly ceases.

Although, in principle it may be possible to make the conduit 60 between the location 52 and mass air flow sensor 56 long enough to minimise the possibility of such contamination, in practice, the amount of space inside the engine compartment of a typical modern motor vehicle is very limited, and it is always desirable to minimise as far as possible the length of such conduits.

Secondly, when the upstream pressure boosting device 18 is a supercharger, there is then a risk that exhaust gas components and oil vapour in the re-circulated crank case gases 42 could contaminate and degrade the motor bearings used in the electrically-driven supercharger 18. Such bearings are normally of the sealed ball type. Although in principle it is possible to provide bearings which are well-protected against such degradation, for example by using oil-fed plain bearings, it is difficult to arrange an oil feed supply from the engine to such bearings.

Introducing exhaust gases 42 solely at either location 52 or location 54 for all operating modes of the two-stage pressure boosting system therefore introduces a number of problems which are expensive or inconvenient to overcome.

The invention substantially avoids or eliminates these difficulties by using the valve 46 to direct 62 crank case gases 42 to the location 54 downstream of the first pressure boosting device 18, but upstream of the second pressure boosting device 20, when the first pressure boosting device 18 is not pressurising the inlet air 8. During this mode of operation, there is no need for any pump to make the crank case gases 42 flow along the evacuation conduit 44 into the air inlet system 5.

When the supercharger 18 is energised, and the pressure at location 54 in the air inlet system 5 rises, and the valve 46 is then automatically actuated to block a back-flow of crank case gases along the second conduit 50, and to direct 64 the crank case gases 42 to flow along the first conduit 48 to the location 52 upstream of the supercharger 18. Because the supercharger 18 is activated, there will then be a significant flow of unpressurised inlet air 58 through the mass air flow sensor 56, and this will prevent contamination from the crank case gases 42, 64 from reaching the mass air flow sensor 56, even when the conduit 60 is short. The increased inlet air flow 58 will also help to dilute and force re-circulated crank case gases 42, 64 through the supercharger 18, thereby reducing any effect such gases may have on the motor bearings in the supercharger 18. Furthermore, because the supercharger 18 is used only intermittently to deal with turbo lag, when the turbocharger 20 is not providing a significant pressure boost at low engine speeds, crank case gases 42, 64 are similarly only introduced intermittently, and for a relatively minor fraction of total engine operating time, at location 52 upstream of the supercharger 18. During the vast majority of engine operating time, crank case gases 42, 62 are introduced into the air inlet system 5 at location 54 downstream of the supercharger 18 and upstream of the turbocharger 20.

The invention therefore provides a convenient and economical way of ventilating an engine crank case 6 when the engine has a two-stage air charge pressure boosting system 18, 20.

It is to be recognized that various alterations, modifications, and/or additions may be introduced into the constructions and arrangements of parts described above without departing from the spirit or scope of the present invention, as defined by the appended claims.

What is claimed is:

1. A crank case ventilation system for an internal combustion engine, comprising an air inlet system for supplying the engine with air, an engine air charge pressure boosting system for boosting the pressure of said air supply, and a crank case evacuation system for drawing crank case gasses from a crank case and introducing said gasses into the air inlet system, wherein:

a) the air charge boosting system has in series a first boost stage and a second boost stage, the first boost stage being upstream of the second boost stage;

b) the crank case evacuation system includes a first conduit and a second conduit for introducing the crank case gasses into the air inlet system, the first conduit introducing said gasses upstream of the first boost stage, and the second conduit introducing said gasses downstream of the first boost stage and upstream of the second boost stage; and c) the crank case evacuation system includes flow control means for controlling the flow of crank case gasses in the first conduit and in the second conduit.

2. The crank case ventilation system of claim 1, in which the flow control means is arranged to direct the flow of crank case gasses to the first conduit when the first boost stage is boosting the pressure of the air supply, and to the second conduit when the first boost stage is not boosting the pressure of the air supply.

3. The crank case ventilation system of claim 1, in which the flow control means is a control valve.

4. The crank case ventilation system of claim 3, in which both the first conduit and the second conduit lead from the control valve to the air inlet system.

5. The crank case ventilation system of claim 4, in which the crank case evacuation system includes a third conduit, said third conduit leading from the crank case to the control valve.

6. The crank case ventilation system of claim 3, in which the control valve is an automatic valve.

7. The crank case ventilation system of claim 3, in which the control valve is passively actuated by pressure differences within said conduits.

8. The crank case ventilation system of claim 3, in which the control valve is a pressure regulated control valve.

9. The crank case ventilation system of claim 1, in which the first boost stage is an electrically-driven supercharger, and the second boost stage is an exhaust gas driven turbocharger.

10. The crank case ventilation system of claim 9, in which the supercharger includes a rotating impeller for compressing inlet air, the impeller being mounted on sealed ball type bearings.

11. The crank case ventilation system of claim 1, in which the crank case evacuation system does not include any means for assisting the flow of crank case gasses in the first conduit or in the second conduit.

12. The crank case ventilation system of claim 1, comprising a mass air flow sensor for measuring the amount of air supplied to the engine, said sensor being provided upstream of the first boost stage.

13. An internal combustion engine having a crank case ventilation system, said ventilation system comprising an air inlet system for supplying the engine with air, an engine air charge pressure boosting system for boosting the pressure of said air supply, and a crank case evacuation system for drawing crank case gasses from a crank case and introducing said gasses into the air inlet system, wherein:

a) the air charge boosting system has in series a first boost stage and a second boost stage, the first boost stage being upstream of the second boost stage;

b) the crank case evacuation system includes a first conduit and a second conduit for introducing the crank case gasses into the air inlet system, the first conduit introducing said gasses upstream of the first boost stage, and the second conduit introducing said gasses downstream of the first boost stage and upstream of the second boost stage; and c) the crank case evacuation system includes flow control means for controlling the flow of crank case gasses in the first conduit and in the second conduit.

14. A method of ventilating a crank case of an internal combustion engine, the engine comprising a crank case, an air inlet system, an engine air charge pressure boosting system including a first boost stage and a second boost stage, and a crank case evacuation system linked to both the crank case and air inlet system, the crank case evacuation system including a flow control means, the method comprising the steps of:

i) using the air inlet system to supply air to the engine;

ii) boosting the pressure of said air supply using the first boost stage and the second boost stage;

iii) using the crank case evacuation system to draw crank case gasses from the crank case and introduce said gasses into the air inlet system; and iv) using the flow control means to control the introduction of said gasses into the air inlet system at a plurality of locations in the air inlet system, including a first location upstream of the first boost stage, and a second location downstream of the first boost stage and upstream of the second boost stage.

15. The method of claim 14, in which the flow control means introduces the crank case gasses at the first location when the first boost stage is activated, and at the second location when the first boost stage is not activated.

* * * * *

UNITED STATES PATENT AND TRADEMARK OFFICE
CERTIFICATE OF CORRECTION

| | |
|---|---|
| PATENT NO. | : 6,722,129 B2 |
| DATED | : April 20, 2004 |
| INVENTOR(S) | : Mark A. Criddle et al. |

It is certified that error appears in the above-identified patent and that said Letters Patent is hereby corrected as shown below:

Title page,
Item [56], References Cited, FOREIGN PATENT DOCUMENTS, insert the following:
-- EP       01310869.1     12/24/2001 --.

Signed and Sealed this

Twenty-eighth Day of September, 2004

JON W. DUDAS
*Director of the United States Patent and Trademark Office*